(12) United States Patent
Foley et al.

(10) Patent No.: US 11,652,931 B2
(45) Date of Patent: May 16, 2023

(54) METHOD AND APPARATUS TO CONNECT TO NETWORK MULTI-FUNCTION DEVICES VIA EMAIL

(71) Applicant: Xerox Corporation, Norwalk, CT (US)

(72) Inventors: Timothy P. Foley, Marion, NY (US);
Patrick J. Howe, Fairport, NY (US);
Richard A. Kalb, Rochester, NY (US);
Glenn Batchelor, Fairport, NY (US);
Ali R. Dergham, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/477,422

(22) Filed: Sep. 16, 2021

(65) Prior Publication Data

US 2023/0079365 A1    Mar. 16, 2023

(51) Int. Cl.
| | | |
|---|---|---|
| *G06F 3/12* | (2006.01) | |
| *H04N 1/00* | (2006.01) | |
| *H04L 51/18* | (2022.01) | |
| *H04L 51/08* | (2022.01) | |

(52) U.S. Cl.
CPC ....... *H04N 1/00326* (2013.01); *G06F 3/1203* (2013.01); *G06F 3/126* (2013.01); *G06F 3/1225* (2013.01); *G06F 3/1238* (2013.01); *G06F 3/1267* (2013.01); *H04L 51/08* (2013.01); *H04L 51/18* (2013.01)

(58) Field of Classification Search
CPC . H04N 1/00326; G06F 3/1203; G06F 3/1225; G06F 3/1238; G06F 3/126; G06F 3/1267; H04L 51/08; H04L 51/18
See application file for complete search history.

(56) References Cited

U.S. PATENT DOCUMENTS

| | | | | |
|---|---|---|---|---|
| 2002/0122199 | A1* | 9/2002 | Lomas | G06F 3/1225 358/1.14 |
| 2002/0191210 | A1* | 12/2002 | Staas | H04L 67/565 358/1.15 |
| 2003/0051011 | A1* | 3/2003 | Schacht | H04L 69/329 709/221 |
| 2011/0299122 | A1* | 12/2011 | Kawakami | H04N 1/00233 358/1.15 |
| 2013/0182284 | A1* | 7/2013 | Oya | G06F 3/1292 358/1.15 |
| 2015/0062623 | A1* | 3/2015 | Yano | G06F 3/1222 358/1.15 |
| 2020/0128141 | A1* | 4/2020 | Sugawara | H04N 1/4433 |

OTHER PUBLICATIONS

HP Customer Support—Knowledge Base, HP Printer—Print with HP ePrint, Jan. 6, 2015, https://support.hp.com/us-en/document/c03721293.

\* cited by examiner

*Primary Examiner* — Huo Long Chen

(57) ABSTRACT

An MFD is disclosed. For example, the MFD includes a processor and a non-transitory computer-readable medium storing a plurality of instructions. The instructions when executed by the processor cause the processor to perform operations that include receiving an email, determining that a user wants to establish a connection based on the email, generating a reply email to the user, wherein the reply email includes an executable file that automatically configures an endpoint device of the user to establish the connection, transmitting the reply email to the user, and establishing the connection to the endpoint device of the user in response to execution of the executable file by the endpoint device of the user.

20 Claims, 6 Drawing Sheets

METHOD AND APPARATUS TO CONNECT TO NETWORK MULTI-FUNCTION DEVICES VIA EMAIL

The present disclosure relates generally to multi-function devices, and relates more particularly to a method and apparatus to connect to network multi-function devices via email.

BACKGROUND

Enterprise environments may have several multi-function devices (MFD) at various locations within a building. The MFDs may be located on different floors, conference rooms, hallways, and the like. The MFDs may also be located across different buildings on a campus of the enterprise or different buildings across different geographic locations.

Currently, employees may have to submit a ticket to an information technology department to try and connect to an MFD. This can be a tedious and time consuming endeavor. Alternatively, it may be difficult for employees to locate and connect to a desired MFD. For example, the employee may not be well versed in navigating through an operating system of a computing device to locate and connect to an MFD.

SUMMARY

According to aspects illustrated herein, there are provided an MFD and a method for connecting to a network MFD via an email. One disclosed feature of the embodiments is an MFD that comprises a processor and a non-transitory computer-readable medium storing a plurality of instructions. The instructions when executed by the processor cause the processor to perform operations that include receiving an email, determining that a user wants to establish a connection based on the email, generating a reply email to the user, wherein the reply email includes an executable file that automatically configures an endpoint device of the user to establish the connection, transmitting the reply email to the user, and establishing the connection to the endpoint device of the user in response to execution of the executable file by the endpoint device of the user.

Another disclosed feature is a method for connecting to a network MFD via an email. The method executed by a processor of the MFD comprises receiving an email, determining that a user wants to establish a connection based on the email, generating a reply email to the user, wherein the reply email includes an executable file that automatically configures an endpoint device of the user to establish the connection, transmitting the reply email to the user, and establishing the connection to the endpoint device of the user in response to execution of the executable file by the endpoint device of the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to connect to a networked MFD via email. As discussed above, enterprises may have several MFDs deployed across different locations within a building, different buildings across a campus, or different buildings across different geographic regions. Many employees may not know how to connect a computing device to a particular MFD.

The present disclosure provides the ability for a user to locate a desired MFD and then connect to the MFD via email. For example, MFDs may be assigned a unique email address when the MFDs are added to a network. The emails of the MFDs may be compiled into a directory that provides location information, capability information, and the email address of the MFD. In another example, the email address may be provided on the MFD directly.

A user may then locate a desired MFD to connect to using the email address associated with the MFD. The email may indicate to the MFD that the user wants to connect to the MFD. In response to the email, the MFD may generate a reply email that includes links or instructions to connect the MFD to the computing device.

The reply email may include links to updated print drivers to ensure that the user has the most updated drivers. The reply email may include a current queue of print jobs and may include email addresses of neighboring MFDs with similar print capabilities that the user may want to connect to that have shorter print queues. As a result, the user may interact directly with the MFDs via emails to connect to the MFDs, troubleshoot problems, or communicate to execute print jobs more efficiently.

Figure 1:
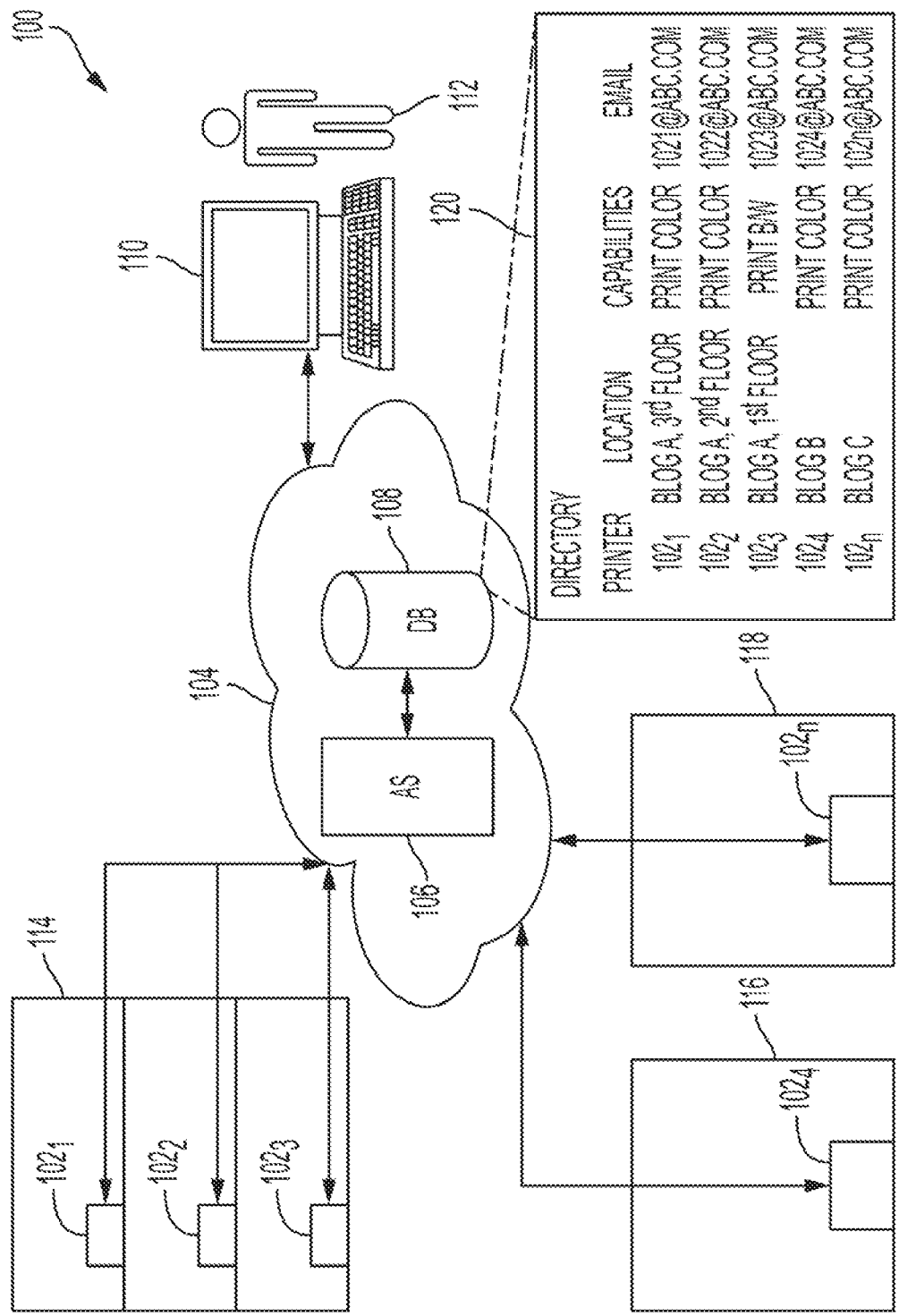
FIG. 1 illustrates a block diagram of an example network with MFDs and a computing device within an enterprise of the present disclosure.

FIG. 1 illustrates an example network 100 of the present disclosure. In an example, the network 100 may include multi-function devices (MFDs) $102_1$ to $102_n$ (hereinafter also referred to individually as an MFD 102 or collectively as MFDs 102) that are networked together via an Internet protocol (IP) network 104.

In an example, the MFDs 102 may be devices with print, copy, scan, and fax capabilities. The MFDs 102 may also be able to email documents that are scanned at the MFDs 102, and so forth. In an example, the MFDs 102 may be printing devices that can print in black and white or in color. The printing devices may be laser printers or an ink jet printers.

Figure 2:
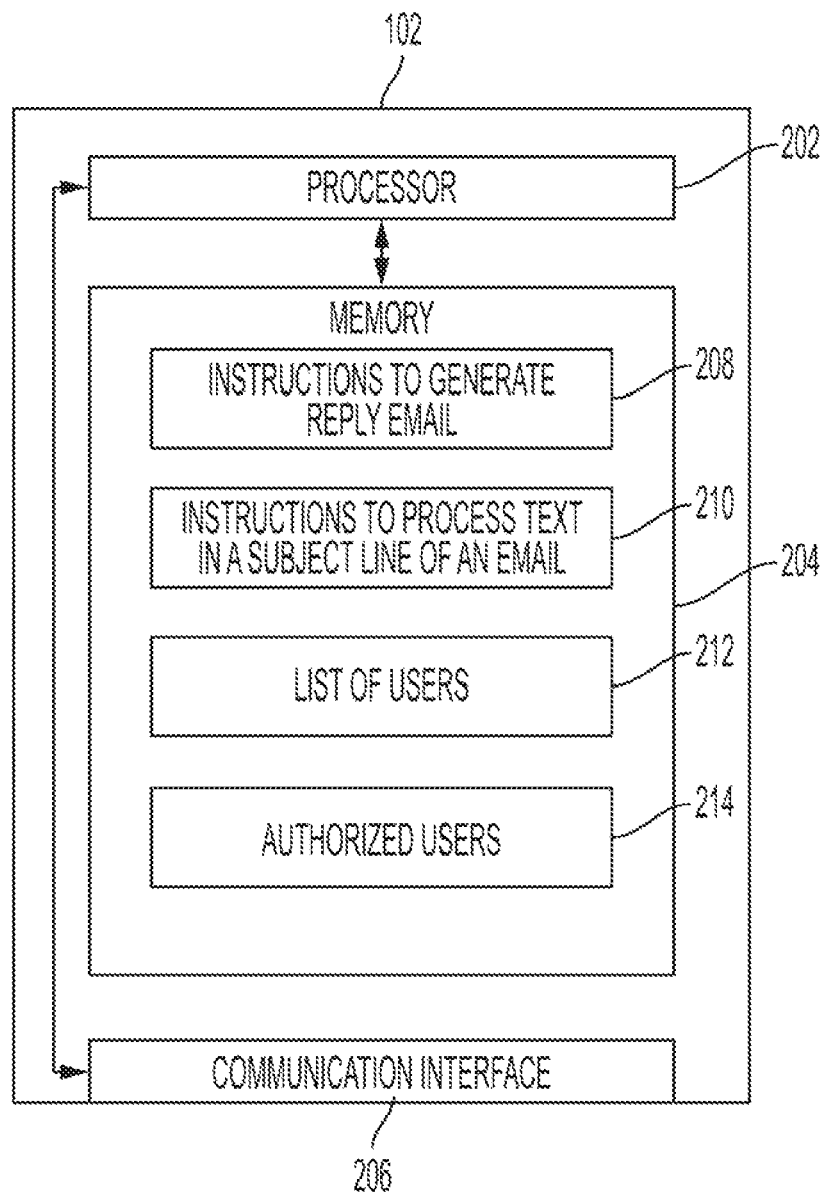
FIG. 2 illustrates a block diagram of an example MFD to connect to a computing device via email of the present disclosure.

FIG. 2 illustrates an example block diagram of a representative MFD 102. In one embodiment, each MFD 102 may include a processor 202, a memory 204, and a communication interface 206. The processor 202 may be communicatively coupled to the memory 204 and to the communication interface 206. The communication interface 206 may be a wired or wireless communication interface. For example, the communication interface 206 may be an Ethernet interface, a WiFi interface, and the like.

In one embodiment, the memory 204 may be any type of non-transitory computer readable medium. For example, the memory 204 may be a solid state drive, a hard disk drive, a random access memory (RAM), a read-only memory (ROM), and the like. The memory 204 may store instructions that are executed by the processor 202 to perform the functions described herein.

In one embodiment, the memory 204 may store instructions to generate a reply email 208, instructions to process text in a subject line of an email 210, a list of users 212, and authorized users 214. The operation and/or functions of the instructions 208 and 210 are described in further details below.

In one embodiment, the list of users 212 may include each user 112 that has previously established a connection to a particular MFD 102. The list of users 112 may include an email address associated with each user in the list of users 212 and/or information associated with a particular computing device 110 that was previously connected. The list of users 212 may be different for each of the MFDs $102_1$ to $102_n$. The lists of users 212 may be used by the MFDs 102 to generate emails to users that may include update information. For example, the update information may include updated print drivers, or other software updates to ensure the MFDs 102 and the computing device 110 are compatible.

The update information may be customized for each computing device 110 that was used by the user 112 to access a particular MFD 102. For example, different computing devices 110 may have different operating systems and may use different versions of an updated print driver or software update.

In one embodiment, the authorized users 214 may include a list of users 112 that are authorized to access a particular MFD 102. For example, some MFDs 102 may be color printers that may be used by certain employees of a particular department. Thus, if a user 112 that is outside of the particular department attempts to connect to a color printer MFD 102, then the user 112 may be denied access.

It should be noted that the FIG. 2 has been simplified for ease of explanation. The MFDs 102 may include other components that are not shown. For example, the MFDs 102 may include user interfaces. The user interfaces may be touch screens or may include physical buttons. The MFDs 102 may include printer trays, printheads, digital front ends to process print jobs from the computing device 110, and the like.

Referring back to FIG. 1, in one embodiment, the MFDs 102 may be deployed across various different locations. For example, the MFDs $102_1$-$102_3$ may be deployed on different floors within a building 114 of an enterprise. The MFDs $102_4$ and $102_n$ may be deployed in different buildings 116 and 118, respectively. The buildings 116 and 118 may be different buildings within a campus location of the enterprise. The buildings 116 and 118 may be located in a different geographic location than the building 114 (e.g., a different office park, city, or the like).

In one embodiment, the MFDs 102 may be networked together or communicatively coupled to the IP network 104. In one embodiment, the computing device 110 may also be communicatively coupled to the IP network 104. The computing device 110 may transmit print jobs to the MFDs 102 via the IP network 104 once the computing device 110 is connected to one of the MFDs 102 via a wired or wireless connection.

In one embodiment, the computing device 110 may be a device with a processor and memory. The computing device 110 may have a display and a user interface. The computing device 110 may be any type of device that can transmit and receive emails via a dedicated email application or a web-based email application. The computing device 110 may be a desktop computer, a laptop computer, a tablet computer, a mobile phone, and the like.

In one embodiment, the IP network 104 may include an application server (AS) 106 and a database (DB) 108. The AS 106 may be an email server that can route emails between devices (e.g., between the computing device 110 and one of the MFDs 102). In one embodiment, the DB 108 may include various information, such as user information, user accounts, network email addresses, and the like.

In one embodiment, as noted above, the present disclosure may allow a user 112 to connect his or her computing device 110 to an MFD 102 via email. In one embodiment, when the MFDs 102 are deployed, the MFDs 102 may be assigned unique email addresses. The email addresses of the MFDs 102 may be stored in a directory 120. The directory 120 may be stored in the DB 108. The user 112 may access the directory 120 using the computing device 110 via the IP network 104. In another embodiment, the directory 120 can be stored locally on the computing device 110.

In one embodiment, the directory 120 may list the email address for each MFD 102, the location of each MFD 102, and the capabilities of each MFD 102. However, it should be noted that other information associated with the MFDs 102 may also be shown in the directory 120. The user 112 may view the directory 120 to locate an MFD 102 that is close to the location of the user 112 and that has the capability to execute a desired print job. In another example, the user 112 may want to choose a printer that is remotely located closer to a recipient of the print job (who may be at a different geographic location). For example, the user 112 may be in the building 114 and may want to send a print job to a colleague located in a different geographic location in building 118.

Figure 3:
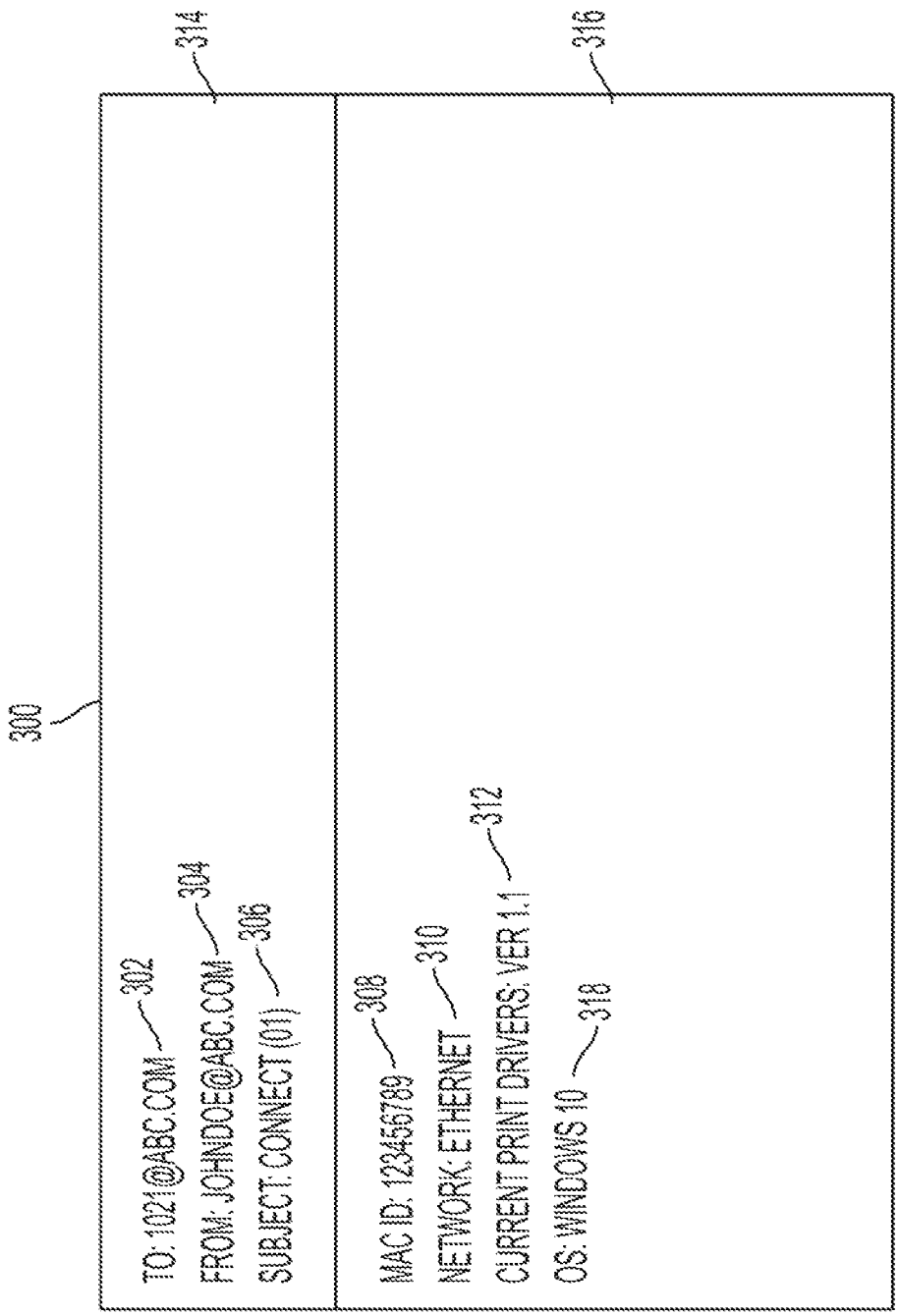
FIG. 3 illustrates a screenshot of an example email to an MFD to connect to the MFD of the present disclosure.

After the user 112 has selected a desired MFD 102, the user 112 may generate an email via the computing device 110 to connect to the desired MFD 102. FIG. 3 illustrates an example email 300 that may be generated to automatically connect a selected MFD 102 with the computing device 110.

In one embodiment, the email 300 may include a header section 314 and a body section 316. The header section 314 may include a destination address 302, a sender address 304, and a subject line 306. The destination address 302 may include an email address of the MFD 102 that is selected by the user 112. In the present example, the user 112 may want to connect to the MFD $102_1$. The sender address 304 may include the email address 304 associated with the user 112.

In one embodiment, the subject line 306 may include alphanumeric text that indicates the intent of the user 112. For example, the subject line 306 may include words or language (e.g., "connect") to indicate that the user 112 wants to establish a connection with the MFD $102_1$. In another example, the subject line 306 may use pre-defined numeric codes (e.g., "01") that are associated with commands. For example, the numeric code 01 may be associated with a connection command. In another example, a combination of text and numeric codes may be used.

In one embodiment, the body 316 may include additional information about the computing device 110. For example, when the computing device 110 detects an address associated with the MFD $102_1$, the information in the body 316 may be automatically gathered by the computing device 110 and entered into the body 316. The information in the body 316 may help the MFD $102_1$ generate custom connections instructions for the computing device 110.

In one embodiment, the information may include a media access control (MAC) identification (ID) 308 of the computing device 110, a network connection information 310, a current print driver 312 installed on the computing device 110, a current operating system (OS) used by the computing device 110, and the like. The information illustrated in FIG. 3 shows a few examples, but it should be noted that other information associated with the computing device 110 may be included.

In one embodiment, the email 300 may then be sent to the MFD $102_1$. The MFD $102_1$ may apply the instructions to process text in a subject line of an email 210 to process the email 300. For example, the instructions 210 may apply a natural language processor to read the subject line and to determine that the user 112 wants to establish a connection to the MFD $102_1$. In another example, the instructions 210 may include a table of numeric codes and commands. For example, numeric code 01 may be a connection command, numeric code 02 may be a print error resolution command, and so forth.

The MFD $102_1$ may process the subject line 306 of the email 300 and may determine that the user 112 wants to establish a connection to the MFD $102_1$. In response to the email 300, the MFD $102_1$ may generate a reply email by executing the instructions to generate a reply email 208. An example of a reply email 400 is illustrated in FIG. 4.

In one embodiment, the MFD $102_1$ may determine if the user 112 is authorized to access the MFD $102_1$. As noted above, some users may not be authorized to access certain MFDs 102. The MFD $102_1$ may determine if the email address in the sender address 304 is found in the authorized users 214 stored in the memory 204 of the MFD $102_1$. If the user 112 is authorized, the MFD $102_1$ may generate the reply email 400. If the user 112 is not authorized, the MFD $102_1$ may generate an email that indicates that the user 112 is not authorized to access the MFD $102_1$ and may include email addresses of other nearby MFDs $102_2$ and $102_3$ that may be publically accessible.

Figure 4:
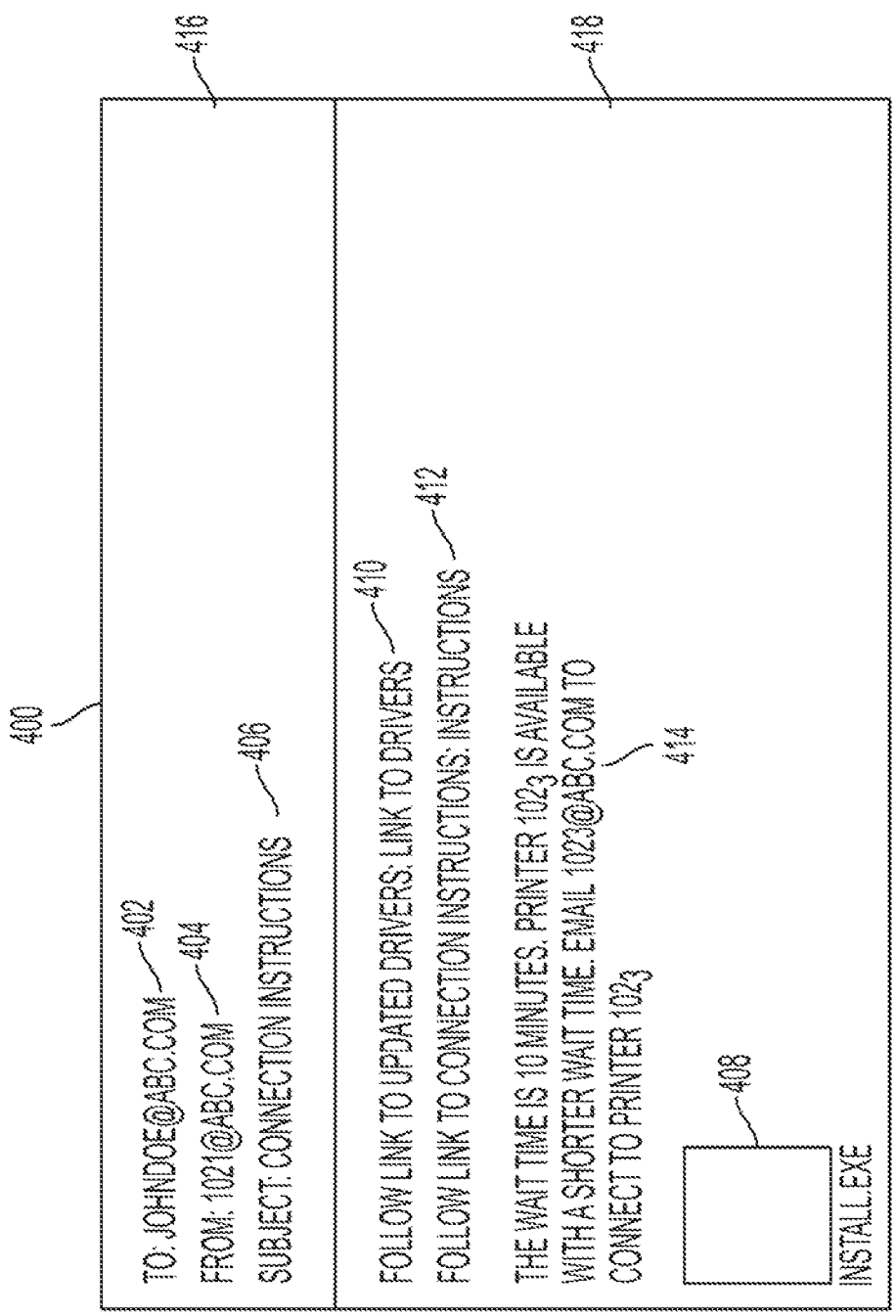
FIG. 4 illustrates a screenshot of an example reply email from the MFD to connect to the MFD of the present disclosure.

FIG. 4 illustrates an example of the reply email 400. In one embodiment, the reply email 400 may include a header section 416 and a body section 418. The header section 416 may include a destination address 402, a sender address 404, and a subject line 406. The destination address 402 may be the email address of the user 112. The sender address 404 may be the email address associated with the MFD $102_1$. The subject line 406 may include a description of the command that is to be executed by the executable files and/or links included in the reply email 400.

In one embodiment, the body section 418 may include an executable file 408 and/or links or information 410, 412, and 414 to cause the computing device 110 to automatically establish a connection to the MFD $102_1$. In one embodiment, the executable file 408 may be a custom file generated for the computing device 110 based on the information in the body section 316 of the email 300 that was received by the MFD $102_1$. For example, the executable file 408 may include a most recent print driver that is compatible with the OS of the computing device 110. In addition, the executable file 408 may include instructions to establish a connection via a wired Ethernet connection based on the network connection indicated in the email 300, and so forth.

When the user 112 receives the email 400 at the computing device 110, the user 112 may select the executable file 408. The computing device 110 may execute the executable file 408 to cause the computing device 110 to automatically add the MFD $102_1$ to a list of available printers on the computing device 110. The executable file 408 may also automatically download and install the most recent print driver that is compatible with the OS of the computing device 110. The executable file 408 may automatically cause the computing device 110 to establish a connection via Ethernet to the MFD $102_1$. The executable file 408 may test the connection by transmitting a test page to the MFD $102_1$. When the test page is successfully printed the executable file 408 may display a notification on the computing device 110 that the connection was successfully established.

In another embodiment, the email 400 may include links 410 and 412 in addition to, or in place of the executable file 408. For example, the link 410 may be a link to updated drivers and the link 412 may be a link to connection instructions. The user may click on the links 410 and/or 412 to manually download the update drivers or read the connection instructions. In one embodiment, the links 410 and/or 412 may be links to executable files that are automatically launched when selected. For example, the executable file 408 may have a large size. As such, the executable file 408 may be stored on the AS 106 or DB 108 and the link 410 and/or 412 may direct the computing device 110 to the executable file 408 from the AS 106 or DB 108.

In one embodiment, the email 400 may include additional information. For example, the MFD $102_1$ may have a large number of print jobs pending in a queue. The email 400 may include email addresses 414 of alternative MFDs 102 that may have shorter print queues and similar capabilities. In an embodiment, the additional information may be presented if the wait time is greater than a threshold (e.g., 5 minutes, 10 minutes, 30 minutes, and the like). In other words, if the calculated wait time is less than the threshold, then the additional information may be left off of the reply email 400.

As such, the user 112 may automatically connect his or her computing device 110 to an MFD 102 via email. Moreover, after the connection is established, the MFDs 102 may continue to communicate with the computing device 110 via email. For example, the user 112 may transmit a print job request to the MFD $102_1$. However, a print error may occur. The MFD $102_1$ may generate a troubleshooting email to be sent back to the user 112 via the computing device 110 to indicate a print error and potential troubleshooting solutions. Alternatively, the user 112 may generate an email to the MFD $102_1$ indicating a print error. For example, the user 112 may include a print error code or text in the subject line 306 of the email 300 that can be processed by the MFD $102_1$.

In another example, the MFD $102_1$ may automatically email the user 112 with an updated print driver when the print drivers are updated. For example, the MFD $102_1$ may automatically track the current print driver and be notified when the print driver is updated with a newer version. The MFD $102_1$ may track the email of each user 112 who has previously connected to the MFD $102_1$ using the list of users 212 stored in the memory 204. When the print driver is updated, the MD $102_1$ may generate an email with the updated print driver, or link to the updated print driver, for each one of the users in the list of users 212.

In one embodiment, the user 112 may send a print job request to the MFD $102_1$ after being automatically connected. The MFD $102_1$ may determine that the current print queue has a wait time above a threshold. The MFD $102_1$ may generate an email to be sent back to the user 112 that includes the email addresses of neighboring MFDs 102 with similar print capabilities and shorter wait times. For example, the print job request may be a color print job for the printer $102_1$ in the building 114. Thus, the email may include email addresses of other color printers in the building 114 (e.g., the MFD $102_2$). Thus, the present disclosure may allow the MFDs 102 to become active participants in the office workspace by interacting with the users 112 via emails once the users 112 to connect to the MFDs 102 via email, as described above.

Figure 5:
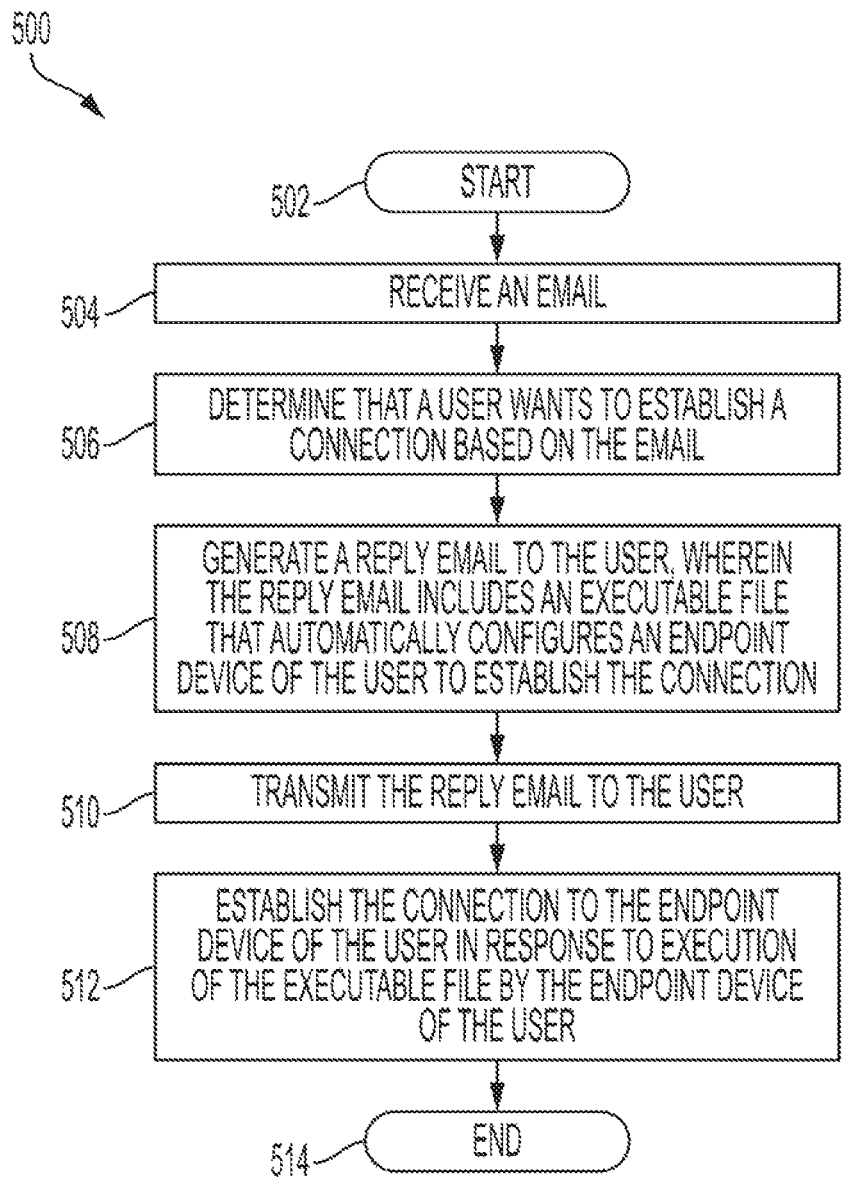
FIG. 5 illustrates a flow chart for a method of automatically connecting a computing device to an MFD via email of the present disclosure.

FIG. 5 illustrates a flow chart of an example method 500 for automatically connecting a computing device to an MFD via email of the present disclosure. In one embodiment, the method 500 may be performed by the MFD 102 or by an apparatus such as the apparatus 600 illustrated in FIG. 6 and discussed below.

In one embodiment, the method 500 begins at block 502. At block 504, the method 500 receives an email. For example, the user may want to establish a connection to a printer or MFD. The user may obtain an email address of the MFD via a label on the MFD locally or via an online directory of MFD email addresses, as described above.

The email may include an indication that the user wants to connect to the MFD. The indication may be alphanumeric text in the subject line of the email that can be processed by the MFD. The email may also include additional information associated with the computing device.

At block 506, the method 500 determines that a user wants to establish a connection based on the email. For example, the MFD may use a natural language processor to read the text in the subject line of the email that includes the desired command. For example, if the user wants to connect to the MFD, the user may include the word "connect," or something similar, in the subject line of the email.

In another example, the MFD may scan for a numeric code in the subject line. The numeric code may be associated with a command. For example, the numeric code 01 may indicate that the user wants to connect to the MFD.

In one embodiment, the MFD may determine if the user is authorized to connect to the MFD. For example, some users may not have permission to connect to certain MFDs.

In one embodiment, the MFD may use the information associated with the user from the email that is received to verify the user account and to determine whether the user has permission to connect to the MFD. In one embodiment, the MFD may query or communicate with a server that tracks user accounts and permissions.

At block 508, the method 500 generates a reply email to the user, wherein the reply email includes an executable file that automatically configures an endpoint device of the user to establish the connection. In one embodiment, the executable file may be customized for a particular computing device of the user. For example, the email sent by the user to the MFD may include information associated with the computing device, such as operating system, type of network connection, a current print driver, and the like.

At block 510, the method 500 transmits the reply email to the user. In one embodiment, the executable file may be an attachment to the reply email that can be launched and executed by the computing device of the user. The executable file may include instructions that cause the computing device to install any updated print drivers (if necessary), to add the MFD to the available printers of the computing device, to establish the connection between the MFD and the computing device using the type of network connection used by the computing device, to test the connection with a test print, and the like. Thus, the user may simply launch the executable file, and the executable file may automatically configure the computing device to establish the connection to the desired MFD.

At block 512, the method 500 establishes the connection to the endpoint device of the user in response to execution of the executable file by the endpoint device of the user. For example, the connection may allow the computing device to send print job requests to the MFD via the network.

As noted above, after the connection is established, the MFD may become an active participant in the office workspace. The MFD may continue to interact with the user via email to notify the user of updated printer drivers, print errors, long print queue wait times with emails to alternative printers to connect to, and the like. At block 514, the method 500 ends.

Figure 6:
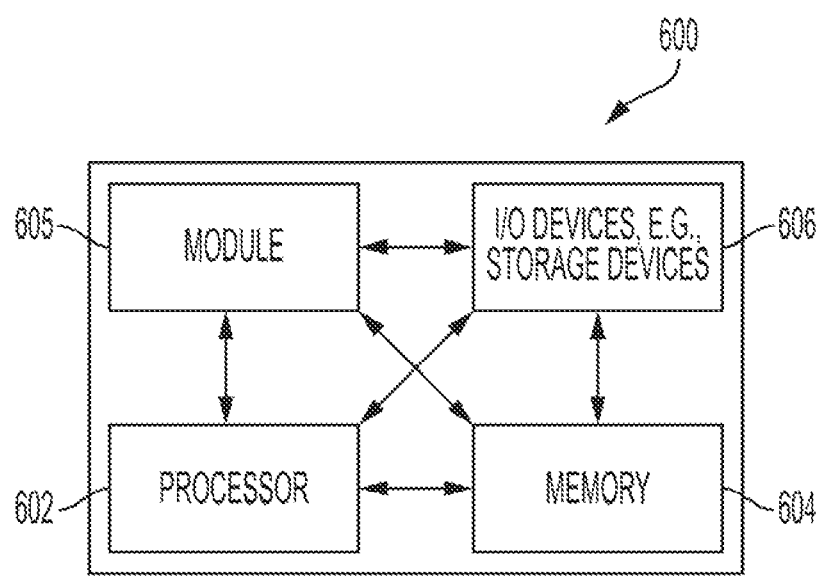
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for automatically connecting a computing device to an MFD via email, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for automatically connecting a computing device to an MFD via email (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for automatically connecting a computing device to an MFD via email (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device (MFD), comprising:
a processor; and
a non-transitory computer-readable medium storing a plurality of instructions, which when executed by the processor, causes the processor to perform operations comprising:
receiving an email, wherein the email includes a body section that includes information about an endpoint device that transmitted the email;
determining that a user of the endpoint device wants to establish a connection based on the email;
generating a reply email to the user, wherein the reply email includes an executable file that is customized for the endpoint device based on the information about the endpoint device contained in the email and, wherein the executable file automatically configures the endpoint device to establish the connection;
transmitting the reply email to the user; and
establishing the connection to the endpoint device of the user in response to an execution of the executable file by the endpoint device of the user.

2. The MFD of claim 1, wherein the operation of determining further comprises:
analyzing text in a subject line of the email with a natural language processor to determine that the user wants to establish the connection.

3. The MFD of claim 1, wherein the operation of determining further comprises:
analyzing a numeric code in the subject line of the email to determine that the user wants to establish the connection.

4. The MFD of claim 1, wherein the executable file comprises a link to automatically download an updated print driver.

5. The MFD of claim 4, wherein the executable file comprises instructions executed by the endpoint device of the user to install the updated print driver, add the MFD to available printers of the endpoint device of the user, and establish the connection between the MFD and the endpoint device of the user.

6. The MFD of claim 1, wherein the operations performed by the processor further comprise:
determining that the user is authorized to access the MFD.

7. The MFD of claim 6, wherein the determining that the user is authorized to access the MFD comprises sending a request to a server to authorize the user.

8. The MFD of claim 1, wherein the operations performed by the processor further comprise:
receiving a request to print;
determining a wait time based on a number of pending print jobs in a print queue; and
including in a further reply email an email address of a neighboring multi-function device with similar print capabilities that has a shorter wait time.

9. The MFD of claim 1, wherein the operations performed by the processor further comprise:
receiving a request to print;
determining an error associated with the request to print;
generating a troubleshooting email addressed to the user; and
transmitting the troubleshooting email to the user.

10. The MFD of claim 1, wherein the operations performed by the processor further comprise:
storing a list of users who have connected to the MFD;
detecting an updated driver;
generating an updated driver email that includes a link to the updated driver; and
transmitting the updated driver email to each user in the list of users.

11. A method, comprising:
receiving, by a processor, an email, wherein the email includes a body section that includes information about an endpoint device that transmitted the email;
determining, by the processor, that a user of the endpoint device wants to establish a connection based on the email;
generating, by the processor, a reply email to the user, wherein the reply email includes an executable file that is customized for the endpoint device based on the information about the endpoint device contained in the email and, wherein the executable file automatically configures the endpoint device to establish the connection;
transmitting, by the processor, the reply email to the user; and
establishing, by the processor, the connection to the endpoint device of the user in response to an execution of the executable file by the endpoint device of the user.

12. The method of claim 11, further comprising:
analyzing, by the processor, text in a subject line of the email with a natural language processor to determine that the user wants to establish the connection.

13. The method of claim 11, further comprising:
analyzing, by the processor, a numeric code in the subject line of the email to determine that the user wants to establish the connection.

14. The method of claim 13, wherein the executable file comprises instructions executed by the endpoint device of the user to install the updated print driver, add the MFD to available printers of the endpoint device of the user, and establish the connection between the MFD and the endpoint device of the user.

15. The method of claim 11, further comprising:
determining, by the processor, that the user is authorized to access the MFD.

16. The method of claim 15, wherein the determining that the user is authorized to access the MFD comprises sending a request to a server to authorize the user.

17. The method of claim 11, further comprising:
receiving, by the processor, a request to print;
determining, by the processor, a wait time based on a number of pending print jobs in a print queue; and
including, by the processor in a further reply email, an email address of a neighboring multi-function device with similar print capabilities that has a shorter wait time.

18. The method of claim 11, further comprising:
receiving, by the processor, a request to print;
determining, by the processor, an error associated with the request to print;
generating, by the processor, a troubleshooting email addressed to the user; and transmitting, by the processor, the troubleshooting email to the user.

19. The method of claim 11, further comprising:

storing, by the processor, a list of users who have connected to the MFD;

detecting, by the processor, an updated driver;

generating, by the processor, an updated driver email that includes a link to the updated driver; and transmitting, by the processor, the updated driver email to each user in the list of users.

20. A multi-function device (MFD), comprising:

a processor; and a non-transitory computer-readable medium storing a plurality of instructions, which when executed by the processor, causes the processor to perform operations comprising:

receiving an email that includes a pre-defined code in a subject line of the email to indicate that a user of an endpoint device wants to establish a connection and a body section that includes information about the endpoint device that transmitted the email;

determining that the user is authorized to access the MFD;

generating a reply email to the user, wherein the reply email includes an executable file that is customized for the endpoint device based on the information about the endpoint device contained in the email and, wherein the executable file automatically configures the endpoint device to establish the connection and downloads an updated driver associated with the MFD;

transmitting the reply email to the user; and establishing the connection to the endpoint device of the user in response to an execution of the executable file by the endpoint device of the user.

* * * * *